United States Patent [19]
Hatz et al.
[11] 4,338,524
[45] Jul. 6, 1982

[54] DRIVE UNIT FOR A COMPRESSOR OF A HEAT PUMP

[75] Inventors: Ernst Hatz; Heinz Eibl, both of Ruhstorf, Fed. Rep. of Germany

[73] Assignee: Motorenfabrik Hatz GmbH & Co. KG, Ruhstorf, Fed. Rep. of Germany

[21] Appl. No.: 25,199

[22] Filed: Mar. 29, 1979

[30] Foreign Application Priority Data

Apr. 5, 1978 [DE] Fed. Rep. of Germany ....... 2814728

[51] Int. Cl.[3] ........................ F01K 17/02; F02C 6/00; F02N 11/14; H02J 3/00

[52] U.S. Cl. .................................... 290/2; 290/30 A; 307/86

[58] Field of Search ................ 290/38 R, 38 C, 38 E, 290/DIG. 1, DIG. 11, 48, 30 R, 30 A, 30 B, 1 R, 2; 123/2; 62/323 C, 324, 160; 307/85, 86

[56] References Cited

U.S. PATENT DOCUMENTS 1,050,739 1/1913 Hull ................................ 290/38 R
2,222,152 11/1940 Newton ........................... 290/30 A
2,327,364 8/1943 Minton ................................ 307/85
2,606,298 8/1952 Merritt ............................ 290/38 C
3,139,924 7/1964 Schreiner ............................ 62/160
3,646,773 3/1972 Falk et al. ............................ 62/324
3,944,837 3/1976 Meyers et al. .......................... 290/2
4,097,752 6/1978 Wulf et al. ........................... 290/20
4,173,951 11/1979 Ishihara ................................ 123/2

*Primary Examiner*—J. V. Truhe
*Assistant Examiner*—Shelley Wade
*Attorney, Agent, or Firm*—Blanchard, Flynn, Thiel, Boutell & Tanis

[57] ABSTRACT

A drive unit for a compressor which is used in a heat pump. The drive unit includes a fuel-injection internal combustion engine which is coupled with the compressor and a starter associated with said engine and is fed from multiphase electric power supply lines. The starter is connected to the electric power supply by means of a switch. The starter is constructed as an electromagnetic drive motor having a stator and a rotor secured to the engine crankshaft and serving at least partly as a flywheel. The coil windings on the stator are fed current from the power source.

7 Claims, 2 Drawing Figures

DRIVE UNIT FOR A COMPRESSOR OF A HEAT PUMP

FIELD OF THE INVENTION

The invention relates to a drive unit in a heat pump.

BACKGROUND OF THE INVENTION

A heat pump is understood to be a system involving a heat-circulation process of the type wherein a liquid cooling means at +2° C. is evaporated in an evaporator and consequently absorbs the heat from a medium, for example water or air, at a temperature of +10° C. The cooling-medium vapor of +2° C. absorbs here approximately 10 kW. heating efficiency and is then drawn away by a compressor. The cooling-medium vapor is condensed to 15.5 bar in said compressor, is heated to +60° C. and is fed to a condenser while absorbing a further 5 kW. (compressor output). Here the cooling-medium vapor emits again the absorbed 15 kW. at an unchanged high pressure and becomes liquid. The heating water, for example for a heating system of a house of the conventional type, is guided through the condensor and absorbs the heat which is emitted from the cooling-medium vapor, which heat is fed now in the heating water to the actual heating purpose.

The liquid cooling means at +60° C. moves from the condensor on to an expansion valve, expands here and assumes a lower pressure of 3.5 bar at a temperature of +2° C. This cooling means is returned to the evaporator and a new cycle of said means in the heat pump starts. (The aforementioned values are only exemplary values and are provided to aid one to easily understand the circulation processes of the heat pump. The physical principles of a heat pump are discussed in detail for example in "VDI-Statusbericht Wärmepumpe" VDI-Verlag, GmbH, Düsseldorf 1976.).

The purpose of the present invention is now to provide a drive unit which is coupled with the compressor in such heat pumps, which drive unit can be operated and serviced easily and without any errors by non-trained persons, for example housewives. This purpose is attained according to the invention by the unit including a fuel-injection internal combustion engine which drives the compressor and a starter associated with said engine being fed power from an electric power line, wherein the starter can be connected to the electric power line by means of a switch.

In the preferred embodiment of the invention, the starter is constructed as an electromagnetic drive motor having a rotor and a stator. The rotor is secured to the crackshaft of the engine and serves at least partially as a flywheel. The stator has coil windings of which current from a three-phase a.c. power-line is fed.

The starting switch can be operated manually in heat pumps of a simple construction. In systems which have a high ease of operation, however, automation will be used, for example a thermostatically controlled relay, which, when falling below a fixed minimum value in the temperature of the heating water for the heating system of the house, closes the starting switch. This automation is preferable in view of the fact that a heat pump is used often only as an auxiliary heating system in a house, which is heated with heating oil, and must be started and turned off many times during changing weather temperatures.

A preferable further development of the invention results when a coupling is arranged between the crankshaft of the engine and the driven shaft of the compressor, which coupling is constructed as a centifugal clutch. The compressor is connected in this manner to the driving fuel-injection internal combustion engine only after same has reached the necessary speed and the predetermined torque.

For the purpose of designing the drive unit as an easily transportable and installable unit, it is preferable to provide a common support frame, on which, with the interpositioning of vibration-damping elements therebetween, the structural components (internal combustion engine, starter, compressor) are secured. An arrangement which is very advantageous with respect to space results when the starter is arranged between internal combustion engine and compressor such that its housing is secured on the one side to the internal combustion engine and on the other side to the compressor.

BRIEF DESCRIPTION OF THE DRAWINGS

Exemplary embodiments of the invention are discussed in the following description with reference to the drawings, in which.

DETAILED DESCRIPTION

Figures 1, 2:
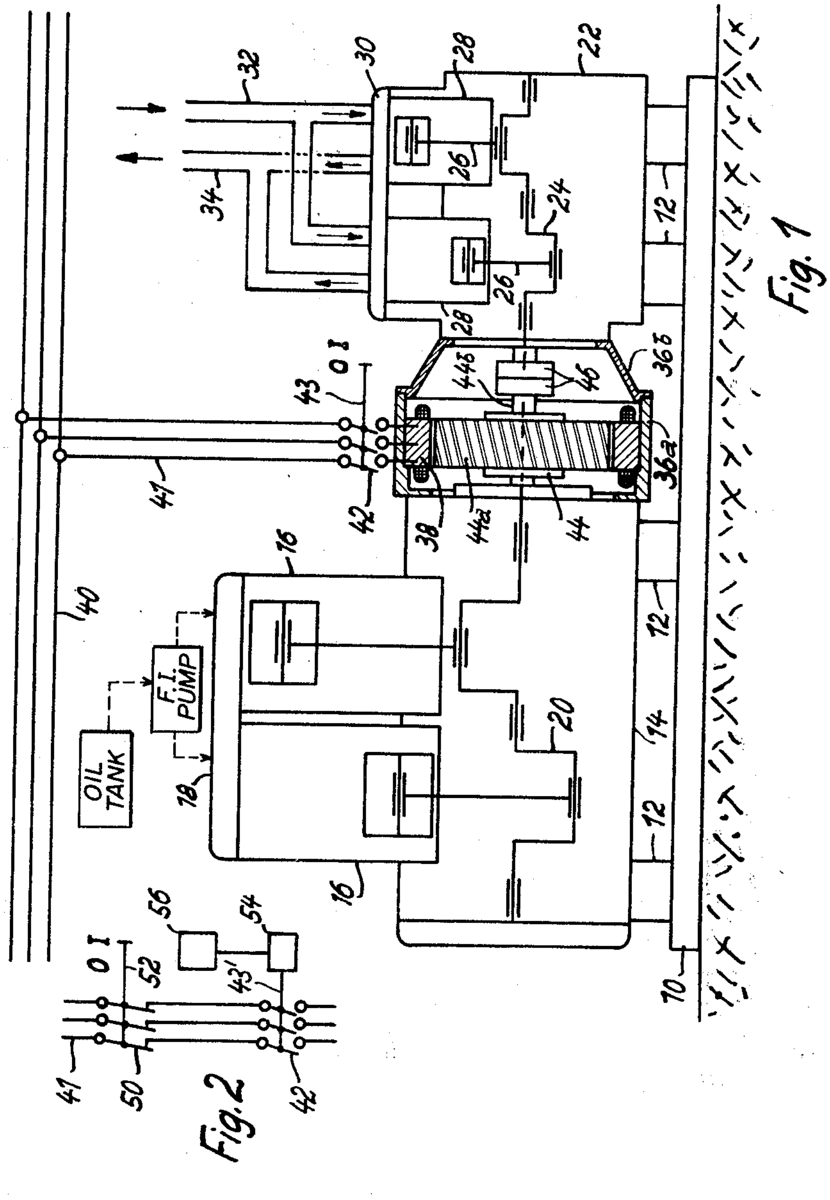
FIG. 1 is a longitudinal cross-sectional view of a schematically illustrated system with associated starter.
FIG. 2 illustrates a modified detail of the system according to FIG. 1.

Reference numeral 10 in FIG. 1 identifies a common support frame for the drive unit, on which, by interpositioning of some vibration-damping elements, for example rubber buffers 12 therebetween, the housing of a two-cylinder, air-cooled fuel-injection internal combustion engine of conventional type and operation is secured. Therefore, the crankshaft housing 14, cylinders 16 and cylinder head 18 of the machine are only schematically indicated. The crankshaft which is supported in the crankshaft housing is indicated by the reference numeral 20. A fuel tank, which is schematically illustrated at J, for example a large tank which is filled with heating oil, is connected to the fuel-injection pump P of the engine. The entire fuel-injection internal combustion engine and its exhaust system are preferably surrounded by a sound-absorbing casing, which facilitates a holding of the noise level of the engine very low. Such a casing can for example be constructed according to the type which is described in German OS No. 23 00 397 or No. 25 47 523.

The two-cylinder compressor which is connected into the circulation of the heat pump is also of a conventional type and operation. It is therefore only schematically illustrated and its housing is identified by the reference numeral 22. The housing 22 is also secured to the support frame 10 by the interpositioning of rubber buffers 12 therebetween. The drive shaft of the compressor is identified by the reference numeral 24 and drives pistons 26, each of which is guided in a cylinder 28. The control valves (not illustrated) are housed in the valve housing 30, through which valves the cooling medium is drawn from a supply line 32 which is connected to the evaporator of the heat pump and is moved after compression into a pressure line 34 of the heat pump, which line extends to the condensor.

To start the internal combustion engine, an electromagnetic starter is provided. The starter housing, which consists of two havles 36*a*, 36*b* which are connected together, is arranged between the internal combustion engine and the compressor. The housing half 36*a* is fixedly mounted on the front wall of the crankshaft housing 14 and the half 36*b* on a lateral flange of the compressor housing 22. The stator 38 with its three coil windings is secured by the interpositioning of appropriate insulation to the inside of the housing half 36*a*. The current supply to the three coils which are coupled in a delta configuration is provided from a three-phase a.c. power-line 40 of 380 volts (or 440 volts) through a supply line 41 and a switch 42 which can be manually closed and opened and released automatically following a start of the engine, the manual regulating unit of which switch 42 is indicated by the reference numeral 43. The marks O and I show the at-rest position and starting position, respectively, of the regulating unit 43. The rotor 44 which is equipped on the periphery with a plurality of metallic armature pieces 44*a* is constructed as a flywheel for the internal combustion engine and is secured with its hub 44*b* to the end of the crankshaft 20.

A releasable coupling, for example a centifugal clutch 46 is secured with its clutch halves on one side to the hub 44*b* of the rotor 44 and on the other side to the end of the driven shaft 24, which end projects into the housing 36*b*. Only after reaching a defined speed of the internal combustion engine is the clutch 46 closed and the drive moment transmitted from the internal combustion engine onto the driven shaft 24 of the compressor. By means of a centrifugal governor of conventional construction, which for example cooperates with the volume-control member of the fuel-injection pump, the amount of injected fuel and thus also the speed of the machine are held at a desired level.

The internal combustion engine and thus also the entire heat pump is stopped by simply closing the fuel supply to the machine, for example by blocking the supply line from the tank to the engine or by returning the mentioned volume-control member to a zero-conveyance position on the fuel-injection pump.

An important increase in the ease of operation is achieved, however, if in place of the afore-discussed manual operation of the start switch 42 for starting and turning off of the entire unit, an automated switch of the following described type is used:

An operating switch 50 is connected between the start switch 42 in the current supply line 41 in FIG. 2 and the power line 40, which switch 50 can be operated by means of a manual regulating unit 52 having the associated marking O and I thereon. If the heat pump is desired to operate over a long period of time, then the operator must move the regulating unit 52 from the at-rest position O to the operating position I and thus the switch 52 is closed. It remains in the closed position until it is again opened after days or weeks for the purpose of a constant shutdown of the heat pump.

The final control element 43' of the start switch 42 is coupled to an electromagnetic relay 54, which can be connected by means of a thermostat 56 to a current source, for example also the current supply line 41. The heat-sensitive control member of the thermostat 56 is directly responsive to the temperature of the heating water of the heating system of the house and operates when the temperature in the heating water falls below a minimum value. The relay 54 then becomes energized and it effects a closing of the switch 42. The starter 38, 44 starts to operate and the internal combustion engine and the compressor are then automatically operated.

It is furthermore preferable to connect into the, for example, transistorized circuit of the relay 54 an electronically controlled timing element (for example a RC-element), which, after a defined period of time, which is necessary for the starting operation, de-energizes the relay 54—independent from the thermostat 56—so that the switch 42 is again opened.

Also a temporary shutdown of the heat pump can be automatically accomplished. It is for example only necessary for this to functionally connect the afore-mentioned volume-control member of the fuel-injection pump with a further relay and a further thermostat associated with said relay in such a manner that upon exceeding of a defined maximum value of the temperature of the heating water, the thermostat is operated and the further relay is energized, which in turn returns the volume-control member (against the action of the centrifugal governor) to a zero-conveyance position.

The described unit requires a minimum of service, namely only a monitoring of the fuel level for the fuel-injection internal combustion engine. The starting of the unit occurs in a simple manner, if desired by an automatic closing of the start switch 42. The unit is stopped also automatically by shutting off the fuel supply. Thus the operation of the unit—also in the case of a repeated turning on and off operation—is very simple and without problems especially for a technically untrained operator, such as a housewife, because in the provided automation only one operating switch 50 is to be closed for longer operating periods of the unit, while the further operation—such as in a common automated heating-oil system for the heating of a house—takes place automatically.

Thus it is not necessary in the desired system to provide a battery to initiate starting and to constantly monitor its operating condition (charge, acid level). Also the usual dynamo for the internal combustion engine is not needed. The starter which is constructed as an electric motor has, compared with conventional starters having a drive pinion and ring gear (for example on the flywheel), the advantage that its parts show hardly any wear even after a very long period of time of operation.

It is also possible to control the current supply to the starter, instead of with the aid of a mechanical switch, in the same manner with an electronic switch (for example with switching transistors).

It is further mentioned that the coil windings in the stator 38 of the starter can be also coupled with one another in a so-called start connection, so that one operates at otherwise equal construction of the starter with only two phases of 220 volts from the electric power grid 40, 41 (in place of a so-called delta connection for 380 volts according to FIG. 1). This is preferable if the electric power supply grid is overloaded and thus weak due to other local loads, or, however, the starter need produce only smaller output torque for starting.

Finally it is to be remarked that it is furthermore preferable to equip the internal combustion engine with an automatic decompression device of a conventional type (for example according to German Patent No. 1 165 341). Said device could by means of the aforementioned further relay be moved into the ready position during the zero return of the volume-control member, in order to then make the starting process easier during the next following starting operation. The decompression device switches off again automatically in a conventional manner after several engine rotations. Starters of a smaller output torque and/or smaller construction are sufficient in such cases.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a heat pump apparatus for use as an auxiliary heater in a household heating system of the kind having an oil-fired furnace, the combination comprising:

a heating oil supply and an oil-fired furnace;

a support frame;

a heat pump including cooling medium, an evaporator, a condenser and a compressor interposed therebetween, said heat pump further including a supply line connecting said condenser to said evaporator of the heat pump for drawing cooling medium therefrom, and a pressure line connecting said compressor to said condenser of the heat pump for supplying compressed cooling medium thereto, said compressor being supported on said frame;

an internal combustion engine supported on said frame, said compressor and the engine being spaced and having coaxial shafts, said internal combustion engine being fuel injected and fueled by said heating oil supply of the furnace;

a multi-phase AC power line connection;

a multi-phase AC electric starter motor comprising a housing supported between and fixed to said engine and compressor, said starter motor having a stator fixed to said housing with multiple coil windings corresponding to the phases of said multi-phase power line connection, said motor having a rotor fixed to said engine shaft;

a centifugal clutch connecting said rotor of said electric motor to said compressor shaft for driving said compressor only with said engine running at above a defined speed;

an operating switch and a start switch connected in series in a multi-phase current supply line connecting said motor to said AC power line connection;

a thermostat having a heat sensitive control portion responsive to the temperature of the heat transfer fluid in said household heating system and a relay responsive to sensing of a household heat transfer fluid temperature fallen below a minimum by said thermostat for closing said start switch and, with said operating switch closed, thereby applying multi-phase electric power to said starting motor and initiating operation of said heat pump.

2. In a drive unit for a compressor in a heat pump, an internal combustion engine coupled with the compressor, an electric starter associated with said engine, an electric power line network connected to said starter through current lines and feeding said starter with current, and at least one switch in said current lines connecting said network to said starter for selectively energizing said starter from said power line network, wherein said network is an AC power line network and the starter is constructed as an AC electromagnetic drive motor having a rotor and a stator, said rotor being secured to the engine crankshaft and serving at least partly as a flywheel, and said stator comprising coil windings through which current is fed from said AC power line network, said heat pump being an auxiliary heater in a household heating system of the kind having an oil-fueled furnace, and including a heating oil supply for said furnace, said internal combustion engine being a fuel injected piston engine fueled by the heating oil supply of said furnace.

3. The improved unit according to claim 2, including a manual operator for operating the switch.

4. The improved unit according to claim 2, including a relay and a thermostat controlling said relay, said relay operating said switch.

5. The improved unit according to claim 2, wherein a coupling is provided between the engine crankshaft and compressor drive shaft, said coupling being a centrifugal clutch.

6. The improved unit according to claim 2, including a common support frame, on which, through interpositioned vibration-damping elements, said engine, starter, and compressor are secured.

7. The improved unit according to claim 6, wherein the starter is arranged between the internal combustion engine and the compressor and its housing is secured on its one side to the front side of the internal combustion engine and on its other side to a lateral flange of the compressor.

* * * * *